Oct. 28, 1930.  E. S. ALEXANDER  1,779,413
DEVICE FOR INCREASING CIRCULATION OF LIQUIDS IN RECEPTACLES
Filed Sept. 16, 1925
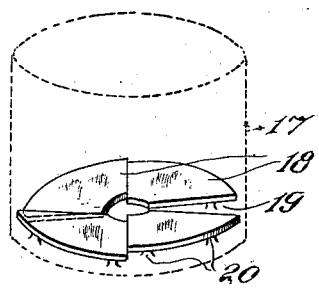
INVENTOR
Earl S. Alexander,
BY
ATTORNEY Patented Oct. 28, 1930

1,779,413

UNITED STATES PATENT OFFICE

EARL S. ALEXANDER, OF NEWARK, NEW JERSEY

DEVICE FOR INCREASING CIRCULATION OF LIQUIDS IN RECEPTACLES

Application filed September 16, 1925. Serial No. 56,581.

This invention relates to a device for increasing the circulation of liquids in receptacles and is adapted to be used in either open or closed receptacles and while it does not form any material obstruction in the body of the receptacle, it furnishes a channel of narrow space so that the liquid confined in this space is quickly heated and thus evacuated. The space so provided is very shallow or narrow compared with the capacity of the receptacle itself.

The device is adapted for use in either open or closed receptacles and while the plate forming, with one of the walls of the receptacle, the narrow space for the liquid to be heated can be made separate from the receptacle and secured in position, I prefer to make the plate integral with the receptacle. The invention is adapted for use in cooking utensils or in tanks in which water is to be heated and can also be made applicable to boiler constructions.

The invention is illustrated in the accompanying drawing which shows a perspective view of a receptacle equipped with the improved circulating construction.

In the drawing I illustrate an open top receptacle 17 with the plates 18 which do not extend to the inside wall of the receptacle so that water can emerge from underneath the plate which is placed on the bottom to provide the space 19 for the liquid to be heated.

The plates 18 are arc-shaped and inclined so that the openings 19 between the plates permit the water to be evacuated with a rotary motion since one end of each plate is higher than the other end thereof and preferably higher than the adjacent edge of the adjoining plate. I show the legs 20 as being means for supporting and spacing the plate from the bottom of the receptacle.

This arrangement of the plates 18 with the upper edge of one plate spaced from the lower edge of the next plate facilitates the vaporization of the liquid. This is due to the breaking up of the body of the water and its division releases the steam so that the steaming qualities of a boiler or similar receptacle is very much improved when equipped with plates arranged in this manner.

This invention is also of value when used in the heating or boiling of mixtures that are to be stirred or agitated since these constructions will automatically attend to this and the agitation or stirring is accomplished by the circulation of the liquid which is more pronounced as the space 12 is made more shallow.

I claim:

In a receptacle, a series of plates arranged to form a false bottom of the receptacle and substantially touching the sides of the receptacle, the plates being inclined so that the upper edge of each plate is higher than the lower edge of the next adjacent plate to form passages for liquid and to break up and direct the liquid into a helical path.

In testimony that I claim the foregoing, I have hereto set my hand, this 2nd day of September, 1925.

EARL S. ALEXANDER.